United States Patent Office
3,661,910
Patented May 9, 1972

3,661,910
5-(SUBSTITUTED-BENZYL)-DIBENZO[a,d]
CYCLOHEPTENES
William J. Houlihan, Mountain Lakes, and Jeffrey Nadelson, Parsippany, N.J., assignors to Sandoz-Wander, Inc., Hanover, N.J.
No Drawing. Filed Oct. 13, 1969, Ser. No. 866,011
Int. Cl. C07d 51/70
U.S. Cl. 260—268 TR                13 Claims

ABSTRACT OF THE DISCLOSURE 5-(substituted-benzyl) - dibenzo[a,d]cycloheptenes e.g. 10,11-dihydro-5-(2-methoxy-α-[4-methyl-1 - piperazinyl] benzyl)-5H-5-dibenzo[a,d]cycloheptenol. The compounds are prepared by treating a substituted benzyl lithium compound with a dibenzo[a,d]cycloheptene. The compounds are useful as hypotensive/antihypertensive agents.

---

This invention relates to substituted dibenzo[a,d]cycloheptenes. More particularly, it relates to 5-(substituted-benzyl) - dibenzo[a,d]cycloheptenes, acid addition salts thereof, intermediates thereof, and processes for their preparation.

The compounds of this invention may be represented by the following structural formula:

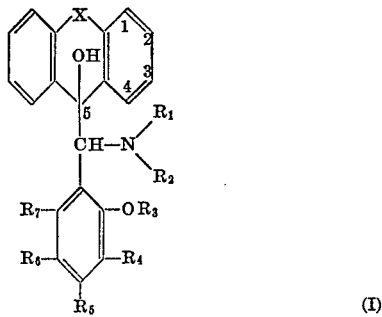

wherein $R_1$ and $R_2$ together are $-(CH_2)_n-$, where $n$ is 4, 5 or 6, or $R_1$ and $R_2$ together are

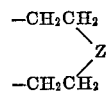

where Z is O, S or N-$R_8$, where $R_8$ is lower alkyl having 1 to 4 carbon atoms, e.g., methyl, ethyl, propyl, isopropyl, butyl or isobutyl;

$R_3$ is straight chain lower alkyl having 1 to 4 carbon atoms, e.g., methyl, ethyl propyl or butyl;

$R_4$ and $R_6$ are, independently, hydrogen, lower alkyl having 1 to 4 carbon atoms, e.g., methyl, ethyl, propyl, isopropyl, butyl, or isobutyl, or lower alkoxy having 1 to 4 carbon atoms, e.g., methoxy, ethoxy, propoxy, isopropoxy, butoxy or isobutoxy;

$R_5$ and $R_7$ are, independently, hydrogen, chloro, lower alkyl having 1 to 4 carbon atoms, e.g., methyl, ethyl, propyl, isopropyl, butyl or isobutyl, or lower alkoxy having 1 to 4 carbon atoms, e.g., methoxy, ethoxy, propoxy, isopropoxy, butoxy or isobutoxy; and X is

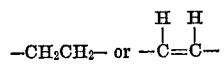

provided that (1) no more than two substituent groups of $R_4$, $R_5$, $R_6$ or $R_7$ may be other than hydrogen, and (2) when either of $R_5$ or $R_7$ is chloro, the other is not chloro.

The process for preparing the compounds of Formula I may be represented by the following reaction scheme A:

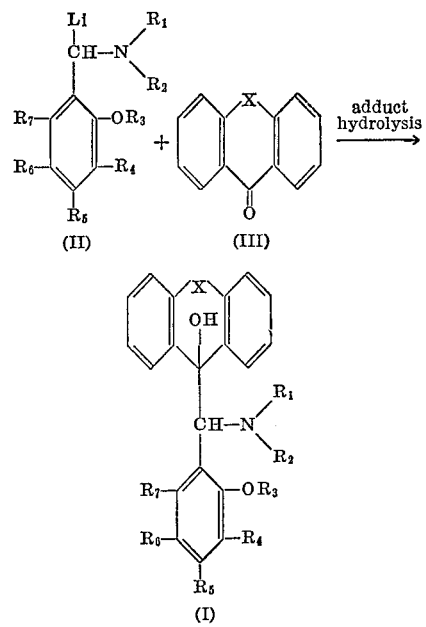

wherein $R_1$, $R_2$, $R_3$, $R_4$, $R_5$, $R_6$, $R_7$ and X have the above-stated significance.

The compounds of Formula I are prepared by treating a compound of Formula II with a compound of Formula III, in an inert solvent such as diethyl ether, tetrahydrofuran, hexane, heptane or the like, in the presence of an inert gas, e.g., nitrogen, helium or argon and subjecting the reaction mixture to hydrolysis, preferably with aqueous ammonium chloride. The reaction may be carried out at a temperature of from 15° to 30° C., preferably from about 20° to 25° C., for about 15 to 48 hours, preferably about 2 to 4 hours. Compound (III) is preferably added in inert solvent (as described above) to a cold (5° to 15° C.) inert solvent solution of compound (II). Neither the solvents nor the temperatures used are critical.

The compounds of Formula I may be prepared in acid addition salt form, such as the hydrochloride, by conventional methods, such as suspending the compound in alcohol or water and treating with the appropriate acid. When it is desired to convert such salts to the corresponding free bases, conventional techniques may be utilized, e.g., dissolution of the salt in water and precipitation using a base such as sodium hydroxide.

The compounds of Formula I may be recovered using conventional recovery techniques such as crystallization.

The compounds of Formula II may be prepared by the following reaction scheme B:

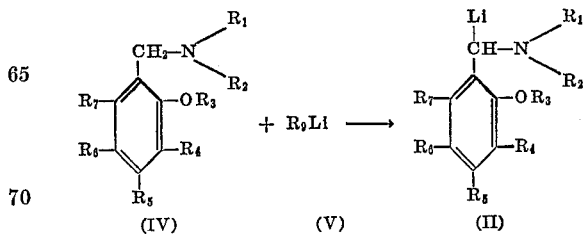

wherein $R_1$, $R_2$, $R_3$, $R_4$, $R_5$, $R_6$ and $R_7$ have the above-stated significance and $R_9$ is lower alkyl having 1 to 4 carbon atoms, e.g., methyl, ethyl, propyl, isopropyl, butyl or isobutyl.

The compounds of Formula II are prepared by treating a compound of Formula IV with an organo lithium compound of Formula V in an inert solvent, in the presence of an inert gas, and at the temperatures indicated in Scheme A, for about 15 to 48 hours, preferably about 22 hours.

Certain of the compounds of Formula III, IV and V are known and may be prepared according to methods disclosed in the literature. Those compounds of Formulas III, IV and V not specifically disclosed are prepared according to analogous methods from known materials.

The compounds of Formula I, especially the compound of Example 1, are useful because they possess pharmacological activity in animals. More particularly, the compounds are useful as a hypotensive/antihypertensive agents as indicated by their activity in the hypertensive rat given orally 50 mg./kg. of animal body weight of active material. Hypertension is induced in the rat by the surgical technique basically as described by A. Grollman, "A Simplified Procedure for Inducing Chronic Renal Hypertension in the Mammal," Proc. Soc. Exptl. Bio. & Med., vol. 57, p. 103 (1944). Blood pressure is monitored by the use of a pneumatic pulse transducer connected to an electronic recorder with the sensor secured to the tail of a rat distal to an occluding cuff.

The compounds of Formula I may be similarly administered in the form of their non-toxic pharmaceutically acceptable acid addition salts. Such salts possess the same order of activity as the free base, are readily prepared by reacting the base with an appropriate acid and accordingly are included within the scope of the invention. Representative of such salts are the mineral acid salts, such as the hydrochloride, hydrobromide, sulfate, phosphate and the like and the organic acid salts, such as the succinate, benzoate, acetate, p-toluenesulfonate, benzenesulfonate, maleate, malate, tartrate, methanesulfonate, cyclohexylsulfamate and the like.

The compounds (I) may be combined with a pharmaceutically acceptable carrier or adjuvant. They may a administered orally or parenterally. The dosage will vary depending upon the mode of administration utilized and the particular compound employed.

In general satisfactory results are obtained when the compounds are administered at a daily dosage of from about 1 to 100 milligrams per kilogram of animal body weight. This daily dosage is preferably given in divided dosage, e.g., 2 to 4 times a day, or in sustained release form. For most large animals, total daily dosage in from about 75 to 750 milligrams. Dosage forms suitable for internal administration comprise from about 18.7 to 375 milligrams of the compound in admixture with a solid or liquid pharmaceutical carrier or diluent.

A representative formulation suitable for oral administration is a tablet prepared by standard tablesetting techniques which contain the following.

Ingredients: Parts by weight
10,11-dihydro-5-(2-methoxy-α-[4-methyl-1-piperazinyl]benzyl) - 5H-5-dibenzo[a,d]cycloheptanol _____ 50
Tragacanth _____ 2
Lactose _____ 39.5
Corn starch _____ 5
Talcum _____ 3
Magnesium stearate _____ 0.5

This invention is illustrated but not limited by the following examples.

EXAMPLE 1

10,11-dihydro-5-(2-methoxy-α-[4-methyl-1-piperazinyl]benzyl)-5H-dibenzo[a,d]cycloheptenol

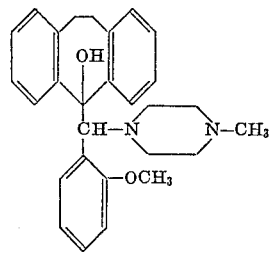

To a flask equipped with a stirrer, dropping funnel, condenser and gas inlet tube maintained under a nitrogen atmosphere, there was added at room temperature 16.5 g. (0.075 mole) of 2-methoxy-α-(4-methyl-1-piperazinyl) benzylamine, 100 ml. anhydrous diethyl ether and then dropwise in ca. 20 minutes 52.2 ml. of 15% n-butyl lithium (0.083 mole) in hexane. After standing at room temperature for ca. 22 hours, the intermediate compound, 2-methoxy-α-[4-methyl-1-piperazinyl]benzyl lithium was formed. The reaction flask was then immersed in an ice-bath and cooled to an internal temperature of 5° C. Stirring was initiated and a solution of 17.3 g. (0.083 mole) of 10,11-dihydro-5H-dibenzo[a,d]cycloheptene-5-one in 100 ml. of diethyl ether was added dropwise in ca. 40 minutes, while maintaining the temperature below 8° C. The ice bath was removed and the mixture allowed to stand at room temperature for 2 hours, and then cooled with an ice bath and the resulting adduct treated with 50 ml. of saturated ammonium chloride. The resulting solid was filtered, washed with cold diethyl ether and then with water, and dissolved in methylene chloride. The methylene chloride solution was dried with anhydrous $MgSO_4$, filtered and concentrated in vacuo. Recrystallization with ethanol gave 10,11-dihydro-5-(2-methoxy-α-[methyl-1-piperazinyl]benzyl) - 5H - 5-dibenzo[a,d]cycloheptenol; M.P. 170–171° C.

EXAMPLE 2

10,11-dihydro-5-(2-methoxy-α-morpholinobenzyl)-5H-5-dibenzo[a,d]cycloheptenol

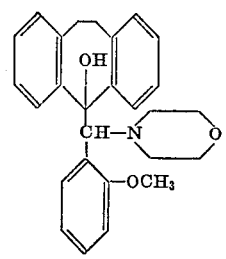

Following the procedure of Example 1, but starting with 3.3 g. (0.016 mole) of 2-methoxy-α-(morpholino benzylamine), 12 ml. of 15% n-butyl lithium (0.019 mole) in hexane, and 30 ml. anhydrous diethyl ether, the intermediate compound 2-methoxy-α-morpholinobenzyl lithium is formed. The intermediate compound is treated with 3.95 g. (0.019 mole) of 10,11-dihydro-5H-dibenzo[a,d]cycloheptene-5-one, in 30 ml. anhydrous diethyl ether, and the resulting adduct is hydrolized to give 10,11 - dihydro - 5 - (2 - methoxy - α - morpholino-benzyl)-5H-5-dibenzo[a,d]cycloheptenol, M.P. 184–186°.

EXAMPLE 3

10,11-dihydro-5-(2-methoxy-α-thiomorpholinobenzyl)-5H-5-dibenzo[a,d]cycloheptenol

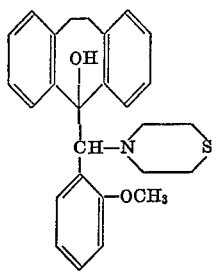

Following the procedure of Example 1, but starting with 4.7 g. (0.02 mole) of 2-methoxy-α-thiomorpholinobenzylamine, 15 ml. of 15% n-butyllithium (0.024 mole) in hexane, and 50 ml. anhydrous diethyl ether, the intermediate compound 2 - methoxy - α - thiomorpholinobenzyl lithium is formed. The intermediate compound is treated with 5.0 g. (0.024 mole) of 10,11 - dihydro - 5H-dibenzo[a,d]cycloheptene-5-one, in 25 ml. anhydrous diethyl ether, and the resulting adduct is hydrolized to give 10,11 - dihydro - 5 - (2 - methoxy - α - thiomorpholinobenzyl) - 5H - 5 - dibenzo[a,d] cycloheptenol.

EXAMPLE 4

10,11-dihydro-5-(2-methoxy-α-pyrrolidinobenzyl)-5H-5-dibenzo[a,d]cycloheptenol

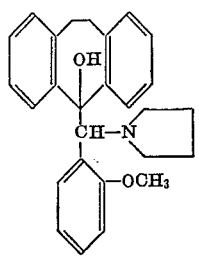

Following the procedure of Example 1, but starting with 3.8 g. (0.02 mole) of 2-methoxy-α-pyrrolidino benzylamine, 15 ml. of 15% n-butyllithium (0.024 mole) in hexane, and 50 ml. anhydrous diethyl ether. The intermediate compound 2-methoxy-α-pyrrolidinobenzyllithium is formed. The intermediate compound is treated with 5.0 g. (0.024 mole) 10,11 - dihydro - 5H - dibenzo[a,d] cycloheptene - 5 - one, in 25 ml. anhydrous diethyl ether, and the resulting adduct is hydrolized to give 10,11-dihydro - 5 - (2 - methoxy - α - pyrrolidinobenzyl) - 5H-5-dibenzo[a,d]cycloheptenol.

EXAMPLE 5

10,11-dihydro-5-(2-methoxy-α-[piperidinobenzyl)-5H-5-dibenzo[a,d]cycloheptenol

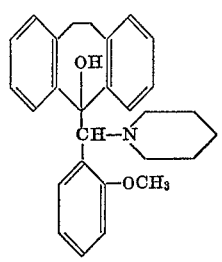

Following the procedure of Example 1, but starting with 4.1 g. (0.02 mole) of 2-methoxy-α-piperidino benzylamine, 15 ml. of 15% n-butyllithium (0.024 mole) in hexane, and 50 ml. anhydrous diethyl ether the intermediate compound 2-methyl-α-piperidinobenzyl lithium is formed. The intermediate compound is treated with 5.0 g. (0.024 mole) 10,11 - dihydro - 5H - dibenzo[a,d]cycloheptene-5-one, in 25 ml. anhydrous diethyl ether, and the resulting adduct is hydrolized to give 10,11 - dihydro - 5 - (2 - methoxy - α - [piperidinobenzyl) - 5H - 5 - dibenzo[a,d]cycloheptenol.

EXAMPLE 6

10,11-dihydro-5-(2-methoxy-α-hexamethyleneiminobenzyl)-5H-5-dibenzo[a,d]cycloheptenol

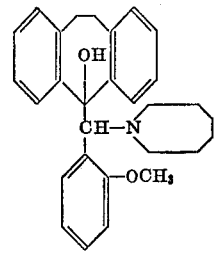

The following the procedure of Example 1, but starting with 4.4 g. (0.02 mole) of 2-methoxy-α-hexamethyleneimino benzylamine, 15 ml. of 15% n-butyllithium (0.024 mole) in hexane, and 50 ml. anhydrous diethyl ether, the intermediate compound 2-methoxy - α - hexamethylaminobenzyl lithium is formed. The intermediate compound is treated with 5.0 g. (0.024 mole) 10,11-dihydro - 5H - dibenzo[a,d]cycloheptene-5-one, in 25 ml. anhydrous diethyl ether, and the resulting adduct is hydrolized to give 10,11-dihydro-5-(2-methoxy-α-hexamethyleneiminobenzyl)-5H-5-dibenzo[a,d]cycloheptenol.

EXAMPLE 7

10,11-dihydro-5-(2,3-dimethoxy-α-[4-methyl-1-piperazinyl]benzyl)-5H-5-dibenzo[a,d]cycloheptenol

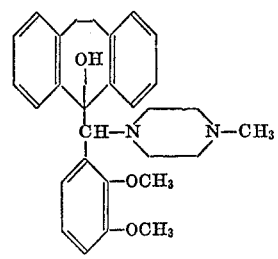

Following the procedure of Example 1, but starting with 5.0 g. (0.02 mole) of 2,3-dimethoxy-α-(4-methyl-1-piperazinyl) benzylamine, 15 ml. of 15% n-butyllithium (0.024 mole) in hexane, and 50 ml. anhydrous diethyl ether, the intermediate compound 2,3 - dimethoxy-α-(4-methyl-1-piperazinyl)benzyl lithium is formed. The intermediate compound is treatel with 5.0 g. (0.024 mole) 10,11-dihydro-5H-dibenzo[a,d]cycloheptene-5-one, in 25 ml. anhydrous diethyl ether, and the resulting adduct is hydrolized to give 10,11-dihydro-5-(2,3-dimethoxy-α-[4-methyl - 1 - piperazinyl]benzyl)-5H-5-dibenzo[a,d]cycloheptenol.

EXAMPLE 8

10,11-dihydro-5-(2-methoxy-3-methyl-α-[4-methyl-1-piperazinyl]benzyl-5H-5-dibenzo[a,d]cycloheptenol

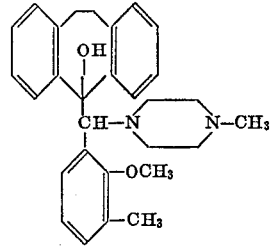

Following the procedure of Example 1, but starting with 4.7 g. (0.02 mole) of 2-methoxy-3-methyl-α-(4-methyl - 1-piperazinyl)benzylamine, 15 ml. of 15% n-butyllithium (0.024 mole) in hexane, and 50 ml. anhydrous diethyl ether, the intermediate compound 2-methoxy - 3 - methyl - α-(4-methyl-1-piperazinyl)benzyl lithium is formed. The intermediate compound is treated with 5.0 g. (0.024 mole) 10,11-dihydro-5H-dibenzo[a,d]cycloheptene-5-one, in 25 ml. anhydrous diethyl ether, and the resulting adduct is hydrolized to give 10,11-dihydro-5 - (2 - methoxy-3-methyl-1-α-[4-methyl-1-piperazinyl]benzyl)-5H-dibenzo[a,d]cycloheptenol.

EXAMPLE 9

10,11-dihydro-5-(2,4-dimethoxy-α-[4-methyl-1-piperazinyl]benzyl-5H-5-dibenzo[a,d]cycloheptenol

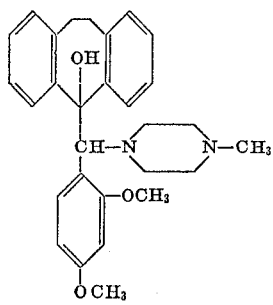

Following the procedure of Example 1, but starting with 5.0 g. (0.02 mole) of 2,4-dimethoxy-α-[4-dimethoxy-α-(4-methyl-1-piperazinyl) benzylamine, 15 ml. of 15% n-butyllithium (0.024 mole) in hexane, and 50 ml. anhydrous diethyl ether, the intermediate compound 2,4-dimethoxy - α - (4-methyl-1-piperazinyl) benzyl lithium is formed. The intermediate compound is treated with 5.0 g. (0.024 mole) 10,11 - dihydro-5H-dibenzo[a,d]cycloheptene-5-one, in 25 ml. anhydrous diethyl ether, and the resulting adduct is hydrolized to give 10,11-dihydro-5-(2,4 - dimethoxy - α-[4-methyl-1-piperazinyl]benzyl-5H-5-dibenzo[a,d]cycloheptenol.

EXAMPLE 10

10,11-dihydro-5-(2-methoxy-4-methyl-α-[4-methyl-1-piperazinyl]benzyl)-5H-5-dibenzo[a,d]cycloheptenol

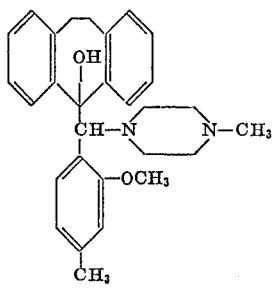

Following the procedure of Example 1, but starting with 4.7 g. (0.02 mole) of 2-methoxy-4-methyl-α-(4-methyl-1-piperazinyl) benzylamine, 15 ml. of 15% n-butyllithium (0.024 mole) in hexane, and 50 ml. anhydrous diethyl ether, the intermediate compound 2-methoxy-4-methyl-α-(4-methyl-piperazinyl)benzyl lithium is formed. The intermediate compound is treated with 5.0 g. (0.024 mole) 10,11-dihydro-5H-dibenzo[a,d]cycloheptene-5-one, in 25 ml. anhydrous diethyl ether, and the resulting adduct is hydrolized to give 10,11-dihydro-5-(2-methoxy-4-methyl-α-[4-methyl-1 - piperazinyl]benzyl)-5H-5-dibenzo[a,d]cycloheptenol.

EXAMPLE 11

10,11-dihydro-5-(2-methoxy-4-chloro-α-[4-methyl-1-piperazinyl]benzyl)-5H-5-dibenzo[a,d]cycloheptenol

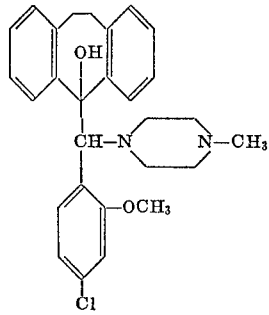

Following the procedure of Example 1, but starting with 5.1 g. (0.02 mole) of 2-methoxy-4-chloro-α-(4-methyl-1-piperazinyl)benzylamine, 15 ml. of 15% n-butyllithium (0.024 mole) in hexane, and 50 ml. anhydrous diethyl ether, the intermediate compound 2-methoxy - 4 - chloro-α-(4-methyl-piperazinyl)benzyl lithium is formed. The intermediate compound is treated with 5.0 g. (0.024 mole) 10,11-dihydro-5H-dibenzo[a,d]cycloheptene-5-one, in 25 ml. anhydrous diethyl ether, and the resulting adduct is hydrolized to give 10,11-dihydro-5-(2-methoxy-4-chloro-α-[4-methyl-1 - piperazinyl]henzyl)-5H-5-dibenzo[a,d]cycloheptenol.

EXAMPLE 12

10,11-dihydro-5-(2-methoxy-5-methyl-α-[4-methyl-1-piperazinyl]benzyl)-5H-5-dibenzo[a,d]cycloheptenol

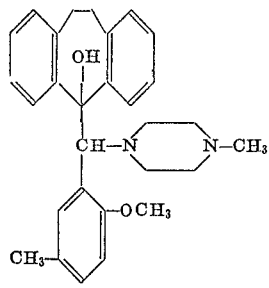

Following the procedure of Example 1, but starting with 4.7 g. (0.02 mole) of 2-methoxy-5-methyl-α-(4-methyl-1-piperazinyl) benzylamine, 15 ml. of 15% n-butyllithium (0.024 mole) in hexane, and 50 ml. anhydrous diethyl ether, the intermediate compound 2-methoxy - 5 - methyl-α-(4-methyl-piperazinyl)benzyl lithium is formed. The intermediate compound is treated with 5.0 g. (0.024 mole) 10,11-dihydro-5H-dibenzo[a,d]cycloheptene-5-one, in 25 ml. anhydrous diethyl ether, and the resulting adduct is hydrolized to give 10,11-dihydro-5-(2-methoxy-5-methyl-α-[4-methyl-1 - piperazinyl]benzyl)-5H-5-dibenzo[a,d]cycloheptenol.

EXAMPLE 13

10,11-dihydro-5-(2,5-dimethoxy-α-[4-methyl-1-piperazinyl]benzyl)-5H-5-dibenzo[a,d]cycloheptenol

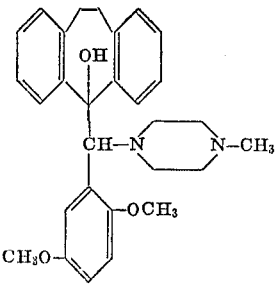

Following the procedure of Example 1, but starting with 5.0 g. (0.02 mole) of 2,5-dimethoxy-α-(4-methyl-1- piperazinyl)benzylamine, 15 ml. of 15% n-butyl lithium (0.024 mole) in hexane and 50 ml. anhydrous diethyl ether, the intermediate compound 2,5-dimethoxy-α-(4-methyl-1-piperazinyl)benzyl lithium is formed. The intermediate compound is treated with 5.0 g. (0.024 mole) 10,11-dihydro-5H-dibenzo[a,d]cycloheptene-5-one, in 25 ml. anhydrous diethyl ether, and the resulting adduct is hydrolyzed to give 10,11-dihydro-5-(2,5-dimethoxy-α-[4-methyl-1-piperazinyl]benzyl)-5H - 5 - dibenzo[a,d]cycloheptenol.

EXAMPLE 14

10,11-dihydro-5-(2-methoxy-6-chloro-α-[4-methyl-1-piperazinyl]benzyl)-5H-5-dibenzo[a,d]cycloheptenol

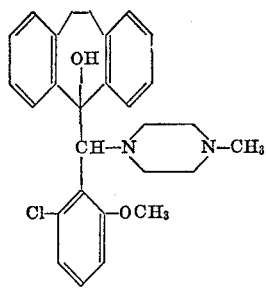

Following the procedure of Example 1, but starting with 5.1 g. (0.02 mole) of 2-methoxy-6-chloro-α-(4-methyl-1-piperazinyl)benzylamine, 15 ml. of 15% n-butyl lithium (0.024 mole) in hexane and 50 ml. anhydrous diethyl ether, the intermediate compound 2-methoxy-6-chloro - α - (4 - methyl - 1 - piperazinyl)benzyl lithium is formed. The intermediate compound is treated with 5.0 g. (0.024 mole) 10,11-dihydro-5H-dibenzo[a,d]cycloheptene-5-one, in 25 ml. anhydrous diethyl ether, and the resulting adduct is hydrolyzed to give 10,11-dihydro-5-(2-methoxy - 6 - chloro - α - [4 - methyl - 1 - piperazinyl]benzyl)-5H-5-dibenzo[a,d]cycloheptenol.

EXAMPLE 15

10,11-dihydro-5-(2-methoxy-6-methyl-α-[4-methyl-1-piperazinyl]benzyl)-5H-5-dibenzo[a,d]cycloheptenol

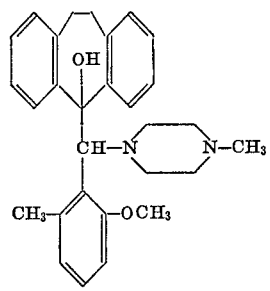

Following the procedure of Example 1, but starting with 4.7 g. (0.02 mole) of 2-methoxy-6-methyl-α-(4-methyl-1-piperazinyl)benzylamine, 15 ml. of 15% n-butyl lithium (0.024 mole) in hexane, and 50 ml. anhydrous diethyl ether, the intermediate compound 2-methoxy-6-methyl - α - (4 - methyl - 1 - piperazinyl)benzyl lithium is formed. The intermediate compound is treated with 5.0 g. (0.024 mole) 10,11-dihydro-5H-dibenzo[a,d]cycloheptene-5-one, in 25 ml. anhydrous diethyl ether, and the resulting adduct is hydrolyzed to give 10,11-dihydro-5-(2-methoxy - 6 - methyl - α - [4 - methyl - 1 - piperazinyl]benzyl)-5H-5-dibenzo[a,d]cycloheptenol.

EXAMPLE 16

10,11-dihydro-5-(2,6-dimethoxy-α-[4-methyl-1-piperazinyl]benzyl)-5H-5-dibenzo[a,d]cycloheptenol

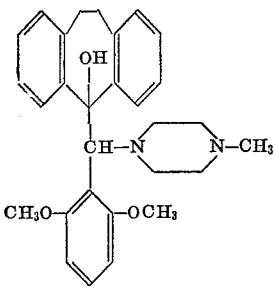

Following the procedure of Example 1, but starting with 5.0 g. (0.02 mole) of 2,6-dimethoxy-α-(4-methyl-1-piperazinyl)benzylamine, 15 ml. of 15% n-butyl lithium (0.024 mole) in hexane and 50 ml. anhydrous diethyl ether, the intermediate compound 2,6-dimethoxy-α-(4-methyl-1-piperazinyl)benzyl lithium is formed. The intermediate compound is treated with 5.0 g. (0.024 mole) 10,11 - dihydro - 5H - diebnzo[a,d]cycloheptene - 5 - one, in 25 ml. anhydrous diethyl ether, and the resulting adduct is hydrolyzed to give 10,11-dihydro-5-(2,6-dimethoxy-α-[4 - methyl - -1 - piperazinyl]benzyl) - 5H - 5 - dibenzo[a,d]cycloheptenol.

EXAMPLE 17

5-(2-methoxy-α-[4-methyl-1-piperazinyl]benzyl)-5H-5-dibenzo[a,d]cycloheptenol

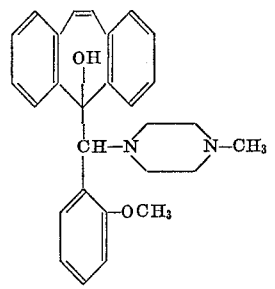

Following the procedure of Example 1, but starting with 4.4 g. (0.02 mole) of 2-methoxy-α-(4-methyl-1-piperazinyl)benzylamine, 15 ml. of 15% n-butyl lithium (0.024 mole) in hexane and 50 ml. anhydrous diethyl ether, the intermediate compound 2-methoxy-α-(4-methyl-1-piperazinyl)benzyl lithium is formed. The intermediate compound is treated with 4.9 g. (0.024 mole) 5H-dibenzo[a,d]cyclohepten-5-one, in 25 ml. of anhydrous diethyl ether, and the resulting adduct is hydrolyzed to give 5-(2-methoxy - α - [4 - methyl - 1 - piperazinyl]benzyl) - 5H-5-dibenzo[a,d]cycloheptenol; m.p. 184–185° C.

What is claimed is:
1. A compound of the formula:

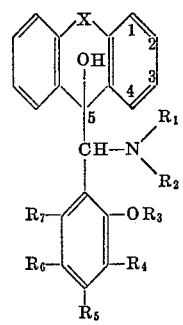

wherein $R_1$ and $R_2$ together are

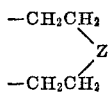

where Z is $N-R_8$, where $R_8$ is lower alkyl having 1 to 4 carbon atoms;

$R_3$ is straight chain lower alkyl having 1 to 4 carbon atoms;

$R_4$ is hydrogen, lower alkyl having 1 to 3 carbon atoms, or lower alkoxy having 1 to 3 carbon atoms;

$R_5$ is hydrogen, chloro, lower alkyl having 1 to 4 carbon atoms, or lower alkoxy having 1 to 4 carbon atoms $R_6$ is hydrogen, lower alkyl having 1 to 4 carbon atoms, or lower alkoxy having 1 to 4 carbon atoms, $R_7$ is hydrogen, chloro, lower alkyl having 1 to 3 carbon atoms, or lower alkoxy having 1 to 3 carbon atoms; and X is

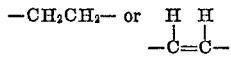

or a pharmaceutically acceptable acid addition salt thereof, provided that (1) no more than two substituent groups of $R_4$, $R_5$, $R_6$ or $R_7$ may be other than hydrogen, and (2) when either of $R_5$ or $R_7$ is chloro, the other is not chloro.

2. The compound of claim 1 which is 10,11-dihydro-5-(2 - methoxy-α-[4-methyl-1-piperazinyl]benzyl)-5H-5-dibenzo[a,d]cycloheptenol.

3. The compound of claim 1 which is 10,11-dihydro-5-(2,3 - dimethoxy - α-[4-methyl-1-piperazinyl]benzyl)-5H-5-dibenzo[a,d]cycloheptenol.

4. The compound of claim 1 which is 10,11-dihydro-5-(2 - methoxy-3-methyl-α-[4-methyl-1-piperazinyl]benzyl-5H-5-dibenzo[a,d]cycloheptenol.

5. The compound of claim 1 which is 10,11-dihydro-5-(2,4 - dimethoxy - α-[4-methyl-1-piperazinyl]benzyl)-5H-5-dibenzo[a,d]cycloheptenol.

6. The compound of claim 1 which is 10,11-dihydro-5-(2 - methoxy - 4-methyl-α-[4-methyl-1-piperazinyl]benzyl)-5H-5-dibenzo[a,d]cycloheptenol.

7. The compound of claim 1 which is 10,11-dihydro-5-(2 - methoxy-4-chloro-α-[4-methyl-1-piperazinyl]benzyl)-5H-5-dibenzo[a,d]cycloheptenol.

8. The compound of claim 1 which is 10,11-dihydro-5-(2 - methoxy-5-methyl-α-[4-methyl-1-piperazinyl]benzyl)-5H-5-dibenzo[a,d]cycloheptenol.

9. The compound of claim 1 which is 10,11-dihydro-5-(2,5 - dimethoxy-α-[4-methyl-1-piperazinyl]benzyl)-5H-5-dibenzo[a,d]cycloheptenol.

10. The compound of claim 1 which is 10,11-dihydro-5-(2 - methoxy-6-chloro-α-[4-methyl-1-piperazinyl]benzyl)-5H-5-dibenzo[a,d]cycloheptenol.

11. The compound of claim 1 which is 10,11-dihydro-5-(2 - methoxy-6-methyl-α-[4-methyl-1-piperazinyl]benzyl)-5H-5-dibenzo[a,d]cycloheptenol.

12. The compound of claim 1 which is 10,11-dihydro-5-(2,6 - dimethoxy - α-[4-methyl-1-piperazinyl]benzyl)-5H-5-dibenzo[a,d]cycloheptenol.

13. The compound of claim 1 which is 5-(2-methoxy-α - [4 - methyl - 1 - piperazinyl]benzyl)-5H-5-dibenzo[a,d]cycloheptenol.

References Cited

UNITED STATES PATENTS

| | | | |
|---|---|---|---|
| 3,258,488 | 6/1966 | Judd | 260—268 X |
| 3,435,073 | 3/1969 | Judd | 260—268 X |
| 3,452,095 | 6/1969 | Adank | 260—268 X |
| 3,503,957 | 3/1970 | Drukker | 260—268 X |

OTHER REFERENCES

Bergmann et al.: Chem. Abstr., vol. 66, col. 85625t (1967).

DONALD G. DAUS, Primary Examiner

U.S. Cl. X.R.

260—239 B, 243 B, 247.7 F, 268 R, 294.7 C, 326.81; 424—246, 248, 250, 267, 274